Figure 1:
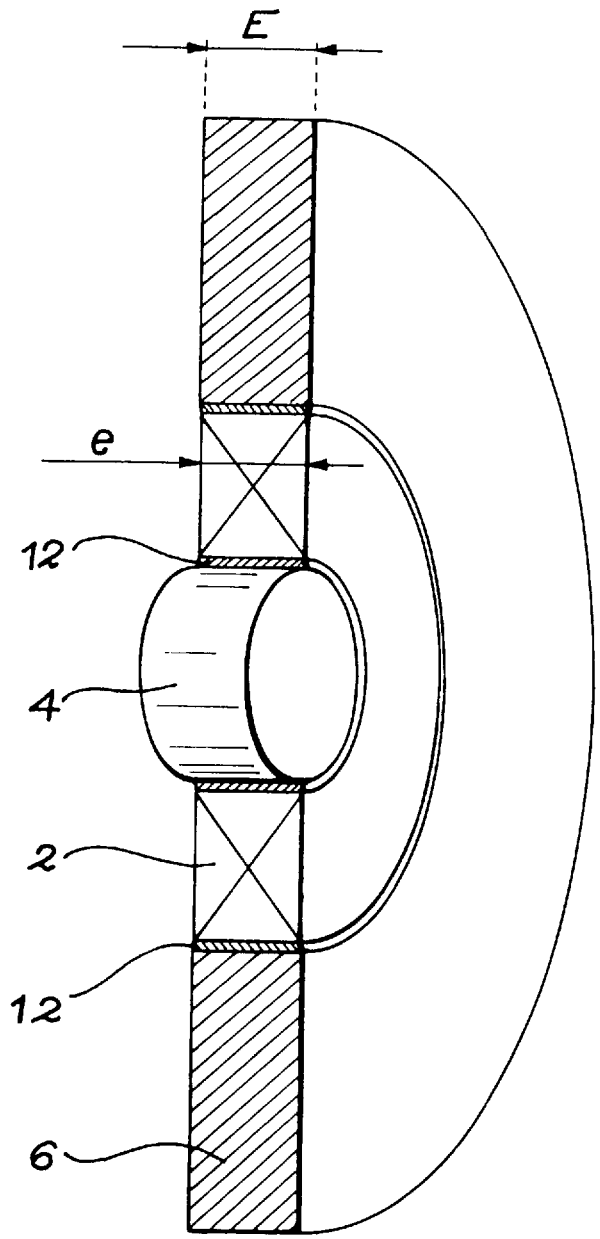

United States Patent [19]

Authesserre et al.

[11] Patent Number: 5,818,244
[45] Date of Patent: Oct. 6, 1998

[54] BRAZED SOLID MATERIAL SPECIMEN HOLDER FOR APPARATUS THAT MEASURES DIELECTRIC AND MAGNETIC PARAMETERS

[75] Inventors: Jacques Authesserre, Saint-Avertin; René Carrera, Pessac; Jean-Marie Maquin, Le Barp, all of France

[73] Assignee: Commissariat a l'Energie Atomique, Paris, France

[21] Appl. No.: 692,643

[22] Filed: Aug. 6, 1996

Related U.S. Application Data

[63] Continuation of Ser. No. 256,391, Jul. 7, 1994, abandoned.

[30] Foreign Application Priority Data

Nov. 13, 1992 [FR] France .................................. 92 13663

[51] Int. Cl.⁶ ..................................................... G01R 27/26
[52] U.S. Cl. ............................ 324/663; 324/654; 324/637
[58] Field of Search ..................................... 324/538, 636, 324/637, 639, 585; 228/121; 201/228

[56] References Cited

U.S. PATENT DOCUMENTS

| | | | |
|---|---|---|---|
| 3,398,388 | 8/1968 | Chow | 339/49 |
| 3,622,944 | 11/1971 | Tsuchiya | 339/118 |
| 3,873,944 | 3/1975 | Vaguine et al. | 333/1.1 |
| 4,582,240 | 4/1986 | Lux | 228/121 |
| 4,801,862 | 1/1989 | Osaki | 324/585 |
| 5,209,833 | 5/1993 | Foell | 205/91 |
| 5,403,449 | 4/1995 | Farmer | 204/228 |
| 5,431,328 | 7/1995 | Chang et al. | 228/180.22 |
| 5,532,604 | 7/1996 | Nagata | 324/636 |

FOREIGN PATENT DOCUMENTS

| | | |
|---|---|---|
| 1535389 | 6/1968 | France . |
| 879268 | 6/1953 | Germany . |
| 2179388 | 7/1990 | Japan . |
| 2246130 | 10/1990 | Japan . |

OTHER PUBLICATIONS

IEEE Transactions on Instrumentation and Measurement, "Dielectric Characterization of Printed Circuit Boards Substrates", C. Heyward Riedell et al., vol. 39, No. 2, Apr. 1990, pp. 437–439.

Hewlett Packard Product Note No. 8510–3, "Measuring Dielectric Constant with the HP 8510 Network Analyser", pp. 1–11.

NASA Technical Memorandum 87628, "Effects of specimen preparation on the accuracy of electromagnetic property measurements of solid materials with an automatic network analyzer", Edward R. Long, Jr., Langley Research Center, Hampton, Virginia, 1986.

Ceramic Bulletin, "Choice of Electrodes in Study and Use of Ceramic Semiconducting Oxides", H.A. Sauer and S.S. Flaschen, vol. 39, No. 6, 1960, pp. 304–306.

International Search Report—PCT/FR/01104—Feb. 7, 1994.

Hewlett Packard, "Measuring Dielectric Constant with the HP8510 Network Analyzer", Product Note No. 8510–3, pp. 1–11, 1985.

*Primary Examiner*—Vinh P. Nguyen
*Assistant Examiner*—Thomas Valone
*Attorney, Agent, or Firm*—Pearne, Gordon, McCoy and Granger LLP

[57] ABSTRACT

Process for measuring dielectric and magnetic parameters of a solid material using a brazing or hard soldering of said material to a sample or specimen holder and apparatuses for performing said process.

According to the invention, a sample or specimen (2) of the material is brazed in an electrically conductive specimen holder (4, 6), which is installed in a measuring line (14), which is connected to a measuring apparatus (32) able to supply informations on the basis of which the parameters are calculated.

Application to the measurement of the dielectric permittivity and magnetic permeability of solid materials.

6 Claims, 3 Drawing Sheets

BRAZED SOLID MATERIAL SPECIMEN HOLDER FOR APPARATUS THAT MEASURES DIELECTRIC AND MAGNETIC PARAMETERS

This is a continuation of application Ser. No. 08/256,391, filed Jul. 7, 1994, now abandoned.

DESCRIPTION

The present invention relates to a process for measuring dielectric and magnetic parameters of a solid material. The invention more particularly relates to the characterization of materials for ultra-high frequency components.

The solid material to be measured can be of the metallic, organic, ceramic or composite type.

The invention aims at accurately measuring the complex magnetic permeability and dielectric permittivity of such a material over a frequency range which is as wide as possible.

A process for measuring the dielectric and magnetic parameters of a solid material is known from the following document:

(1) Hewlett Packard, Product Note No. 8510-3, "Measuring Complex Permittivity and Permeability with the HP 8510 Network Analyzer".

This document describes the manner of carrying out such a measurement using coaxial lines or rectangular waveguides, in the field of radio frequencies or microwaves.

For measurements using rectangular waveguides, the specimen of the material to be measured is inserted in a specimen holder, whose interfaces are compatible with adaptors of coaxial cables to waveguides. For measurements using coaxial lines, the specimen of the material to be measured is placed in a specimen holder constituted by a 50 ohm air line section.

In both cases, it is necessary for the specimen to be perfectly adjusted to the dimensions of the specimen holder, (but the setting must be of a sliding nature for fitting purposes).

This operation is easier to carry out in a rectangular waveguide than in a coaxial guide. However, a rectangular waveguide makes it possible to carry out the measurements in a narrower frequency range than that which can be studied with a coaxial guide.

Thus, for characterizing a material in a rectangular waveguide between 2 and 18 GHz, it is necessary to have six specimens, whereof the largest must have a cross-section of 54.61 mm ×109.22 mm. However, a single annnular specimen with an external diameter of 7 mm is adequate in the case of a coaxial line.

The presence of the clearance necessary for the fitting of the specimen unavoidably induces a measuring error, which it is very difficult to evaluate by calculation due to the large number of parameters to be taken into account, more particularly the electromagnetic properties of the material, the surface state, the thickness, the specimen centring and the wave propagation mode.

Reference should also be made to the following document:

(2) NASA Technical Memorandum 87628, "Effects of specimen preparation on the accuracy of electromagnetic property measurements of solid materials with an automatic network analyzer", Edward R. Long, Jr., Langley Research Centre, Hampton, Va.

The research described in the above document, which relates to measurements in rectangular waveguides, demonstrates that in order to obtain electromagnetic characteristics to within 1%, the clearance in the direction of the small dimension of the rectangle must be 10.18 mm, i.e. smaller than 50 micrometers.

It has also been experimentally found that the measurement in a coaxial line of a barium titanate specimen of the type marketed by XTALONIX under the reference K30 and for which the indicated permittivity is 30, lead to an experimental value of 17 with a resonance of 10 GHz, which cannot be imputed to the material. In this measurement, the clearance between the specimen and the coaxial line was max 15 micrometers.

The present invention aims at measuring the dielectric and magnetic parameters of a solid material with great accuracy and in order to do this the specimen of the material to be measured is put into place in a specimen holder with a very good electrical contact and without any clearance.

More specifically, the present invention relates to a process for measuring the dielectric and magnetic parameters of a solid material, according to which a specimen of said material is placed in an electrically conductive specimen holder, which is installed in a measuring line, which is connected to a measuring apparatus able to supply informations on the basis of which the parameters are calculated, said process being characterized in that the specimen is brazed or hard soldered in the specimen holder.

According to an embodiment of the process according to the invention, the specimen is brazed in the specimen holder by means of ambient temperature brazing using a ternary mixture of indium, gallium and tin.

The weight composition of the ternary mixture can be approximately 19% indium, 60% gallium and 21% tin, the viscosity of said mixture being regulated by adding tin.

Preferably, said ternary mixture is obtained from a eutectic mixture of indium and gallium, in order to favour the electrical contact between the specimen and the specimen holder.

According to a preferred embodiment of the process according to the invention, prior to brazing, the specimen holder is cleaned with ethanol and using a pure indium sheet, the faces of the specimen holder and the specimen intended to receive the brazed connection are rubbed, so as to favour the wetting of said faces by the brazing.

In a first variant, the specimen has an annular shape, the specimen holder having a cylindrical central core and a ring between which the specimen is inserted and brazed, the measuring line having a first coaxial connector with a threaded sleeve or collar, whose length is adequate to receive the specimen holder, and a second coaxial connector, the specimen holder provided with the specimen being inserted in the threaded sleeve of the first connector in such a way that its axis coincides with the specimen axis and the second connector is connected to the first connector by means of said threaded sleeve.

Preferably, the central core and the ring of the specimen holder have the same thickness, which is equal to or slightly larger than that of the specimen, so that the measuring line has a good electrical continuity.

The central core and the ring of the specimen holder are preferably made from brass, which has a good mechanical strength, a low electrical resistivity and a good oxidation resistance.

Finally, in a second variant, the specimen is shaped like a rectangular parallelepiped, the specimen holder being a rectangular waveguide in which the specimen is inserted and brazed and the measuring line has two rectangular waveguides between which the specimen holder is fitted.

The present invention also relates to an apparatus for measuring the dielectric and magnetic parameters of an annular solid material specimen, characterized in that it comprises a specimen holder having a central, cylindrical core and a ring, between which the specimen is to be inserted and brazed, a brazed connection or joint for the brazing of the specimen in the specimen holder, a first coaxial connector having a threaded sleeve or collar, whose length is adequate to receive the specimen holder provided with the specimen, and a second coaxial connector connectable to the first connector by means of said threaded sleeve, the axis of the first connector coinciding with the axis of the specimen when the specimen holder provided with the specimen is inserted in the threaded sleeve.

It also relates to an apparatus for measuring electrical and magnetic parameters of a specimen in a solid material having a rectangular parallelepiped shape, characterized in that it comprises a specimen holder constituted by a rectangular waveguide in which the specimen is to be inserted and brazed, a brazed joint for the brazing of the specimen in the specimen holder and two rectangular waveguides between which the specimen holder can be fitted.

The invention is described in greater detail hereinafter relative to non-limitative embodiments and with reference to the attached drawings, wherein show:

FIG. 1 Diagrammatically a specimen holder usable in the present invention.

Figure 2:
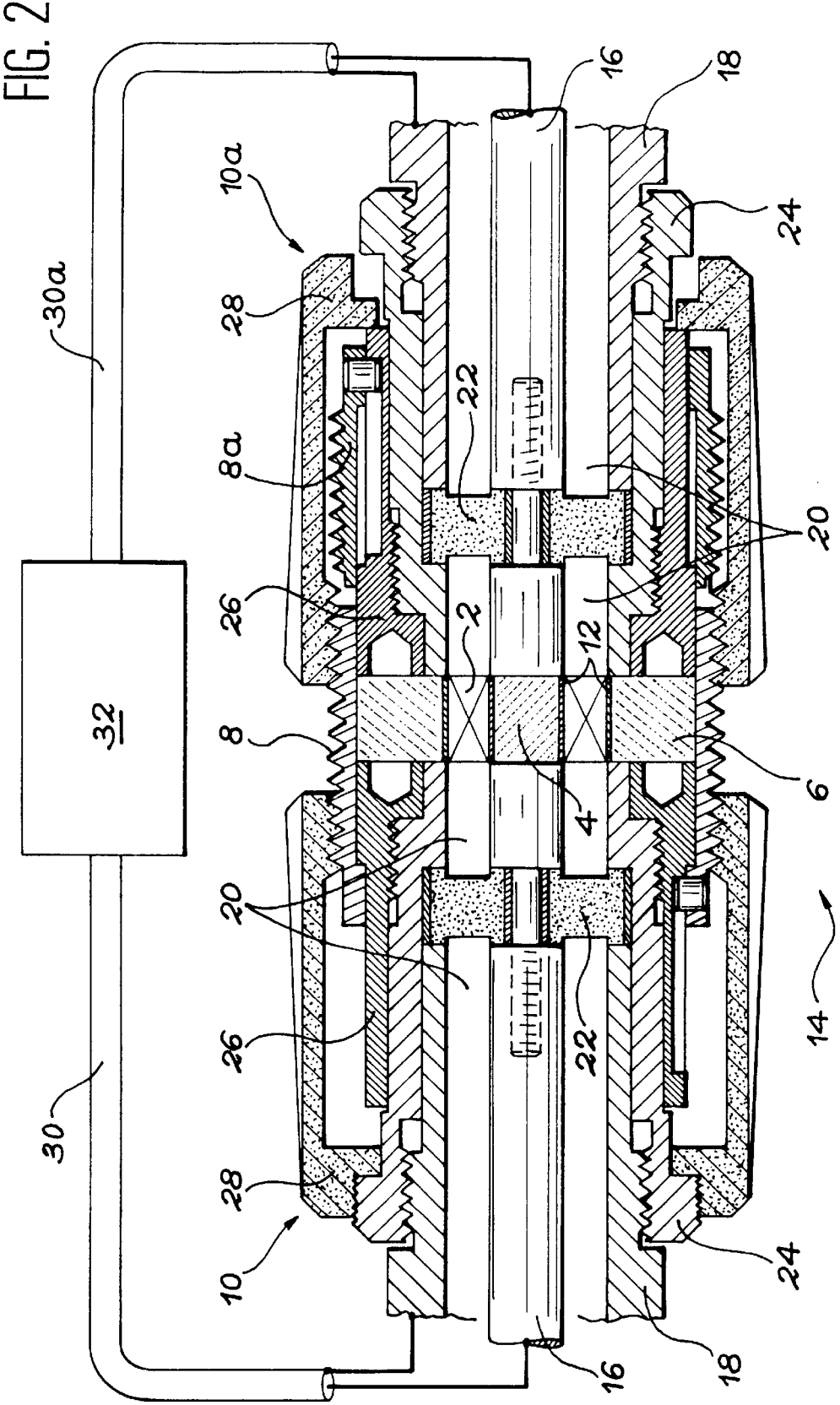

FIG. 2 A diagrammatic view of a measuring line using the specimen holder shown in FIG. 1 for performing a process according to the invention.

Figure 3:
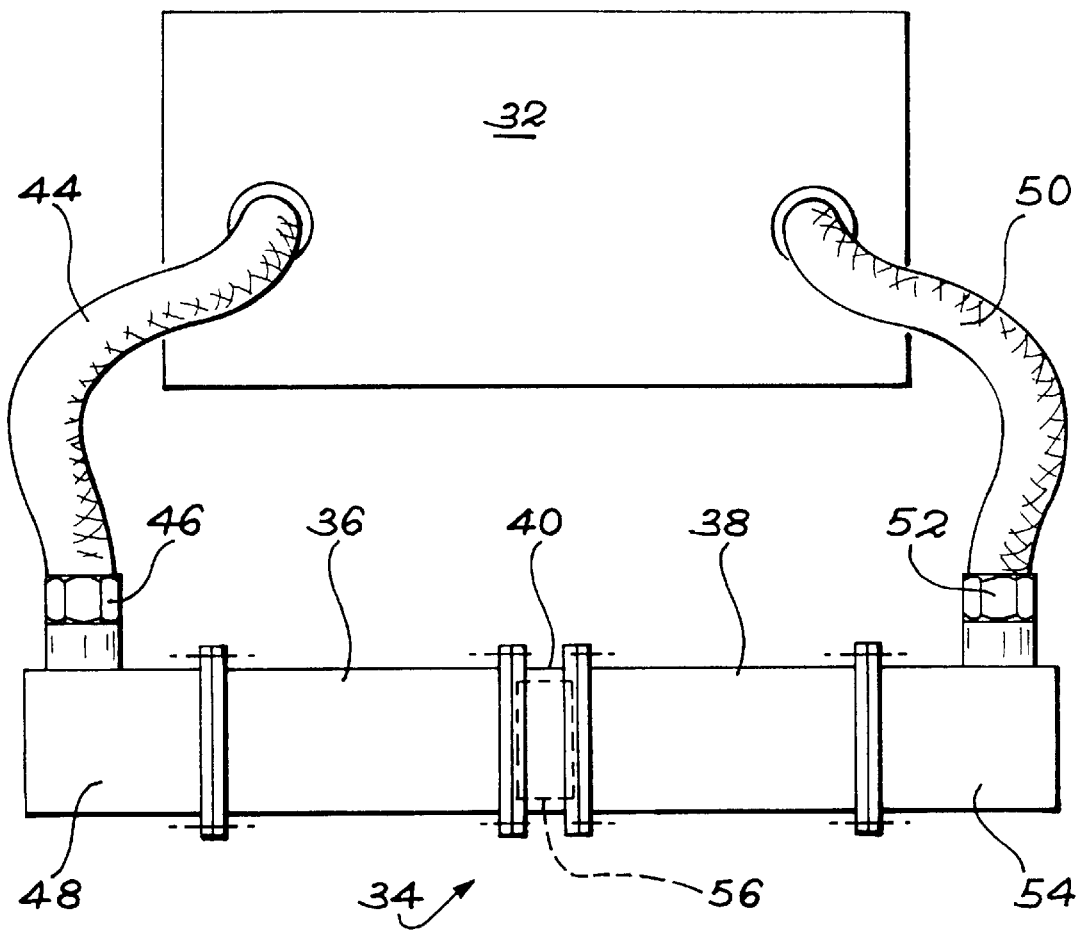

FIG. 3 A diagrammatic view of another measuring line permitting the performance of the process according to the invention.

Figure 4:
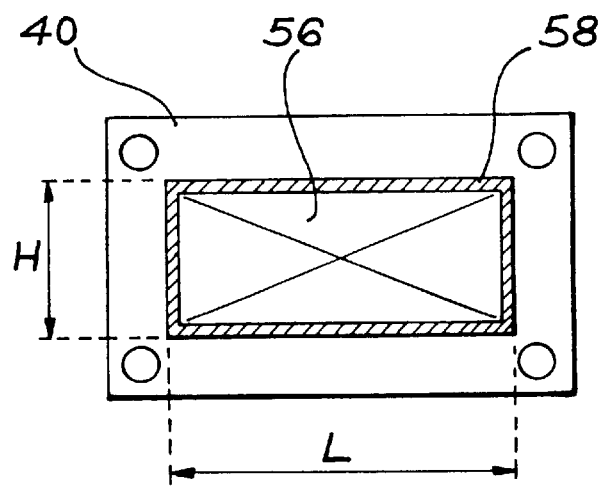

FIG. 4 A diagrammatic front view of a specimen holder used in the measuring line shown in FIG. 3.

A description will be given hereinafter of a specific embodiment of the process according to the invention with reference to FIGS. 1 and 2.

FIG. 1 shows a specimen 2 of a material, such as barium titanate in exemplified manner, whereof it is wished to measure the dielectric permittivity and magnetic permeability.

In this embodiment, the specimen 2 is annular and is brazed at ambient temperature in a specimen holder constituted by a central core 4 and a ring 6.

For said brazing operation, use is made of a ternary mixture of indium, gallium and tin, after which the specimen holder provided with the specimen 2 is fitted in a coaxial connector, which is an adaptation of a known coaxial connector of type APC7 (registered trade mark). This known connector is marketed by AMPHENOL and is described in the following document:

(3) French patent 1 535 389, application date 1.9.1967, granted 24.6.1968 entitled "Universal electrical connector" (Amphenol Corporation).

The dimensions of the annular specimen 2 are adapted to those of the coaxial line used, namely an external diameter between 6.99 and 7.00 mm and an internal diameter between 3.04 and 3.05 mm.

The thickness of the specimen is chosen as a function of the estimated electromagnetic properties of the studied material.

The central core 4 of the specimen holder is cylindrical and its diameter is 0.1 mm smaller than the internal diameter of the specimen 2 (i.e. being 2.94±0.01 mm).

The specimen holder ring 6 has an internal diameter 0.1 mm larger than the external diameter of the specimen and which is therefore 7.1±0.01 mm.

There must be no significant clearance between the specimen and the specimen holder, being a few hundredths of a millimetre at the most. The external diameter of the ring 6 is used for the centring of the assembly constituted by the specimen holder and the specimen 2 brazed therein, with respect to the axis of the coaxial line. This external diameter is fixed at 14.85±0.01 mm, so that the ring 6 can be fitted in the threaded sleeve 8 (FIG. 2) of the coaxial connector 10 used and to which further reference will be made hereinafter.

The metallic material used for producing the central core 4 and the ring 6 is preferably brass for the reasons indicated hereinbefore.

Details will be given hereinafter of the method for brazing the specimen 2 in the specimen holder constituted by the central core 4 and the ring 6.

The brazed joint 12 used for this purpose is obtained with the aid of a ternary mixture of indium, gallium and tin, whose minimum weight composition is 19% indium, 60% gallium and 21% tin. It is a eutectic indium-gallium mixture (respectively 24 and 76% by weight) to which are added 15% by weight tin. This ternary mixture is obtained by mixing in a crucible at approximately 130° C., the indium-gallium-tin eutectic (21/66/13%) and approximately 10% by weight tin.

The choice of an indium-gallium eutectic as the basis for the mixture is due to the results given in the following document:

(4) Article by H. A. Sauer and S. S. Flaschen, published in Ceramic Bulletin, vol. 39, No. 6, 1960, pp 304 to 306, "Choice of electrodes in study and use of ceramic semiconducting oxides".

These results very clearly show the capacity of the indium-gallium eutectic to trap the surface oxygen ions of the material to be characterized and favour the electrical contact.

The mixture obtained is liquid at ambient temperature (approximately 20° C.). The viscosity of said mixture is then regulated by adding tin so as to obtain a product which is slightly pasty at ambient temperature.

The viscosity is experimentally optimized in order to perform the brazing operation at ambient temperature and ensure an adequate mechanical fixing of the specimen 2 at said temperature.

A variation of a few per cent by weight with regards to the percentage of each of the three constituent elements of the mixture can be accepted, provided that the consistency of the mixture (measurable by an appropriate means) is correct.

The thus optimized ternary alloy very poorly wets the surface of the materials with which it is in contact. This is why the cylindrical faces of the specimen 2, the central core 4 and the ring 6 and which are intended to receive the brazed joint undergo a prior preparation which will be described hereinafter.

This preparation consists of cleaning the central core 4 and the ring 6 with ethanol and manually rubbing their faces, as well as those of the specimen, which are intended to receive the brazed joint, using a sheet of pure indium in order to bring about a mechanical attachment of the indium particles. The brazed joint is then made on the thus prepared cylindrical faces of the specimen 2 using a stainless steel spatula.

The brazing quantity deposited must be adequate to fill the clearance between the specimen and the specimen holder and is then carefully distributed over the entire periphery of the specimen by the person performing the brazing operation.

The specimen 2 is then inserted between the central core 4 and the ring 6 of the specimen holder on a working plane. The specimen 2 is then rendered integral with the two parts of the specimen holder. The two faces of the thus obtained assembly are cleaned with ethanol before fitting it in the measuring line.

This measuring line 14 in FIG. 2 comprises a conventional coaxial connector 10a, referred to hereinbefore, the coaxial connector 10 and the specimen holder in which is brazed the specimen and which is fixed between the connectors 10 and 10a.

The coaxial connector 10a, described in citation (3), essentially comprises an internal conductor 16, an external conductor 18, separated from the internal conductor by an air gap 20, an electrically insulating support 22 ensuring a mechanical connection between the internal conductor 16 and the external conductor 18, a body 14, a fitting 26, a threaded sleeve 8a and a nut 28.

The coaxial connector 10 is identical to the coaxial connector 10a of type APC7 (registered trade mark), except that its threaded sleeve 8 is longer than the corresponding threaded sleeve 8a and there is also a longer threaded portion than that of the sleeve 8a, so as to receive the specimen holder in which is fitted the specimen 2 and so as to permit the fitting of the connectors 10, 10a. The length of said threaded portion of the sleeve 8 is a function of the thickness e of the specimen 2.

In order to perform the measurements, the specimen holder equipped with the specimen 2 is inserted in the threaded sleeve 8 of the coaxial connector 10 (for carrying out correct measurements the axis of the connector 10 should coincide with the axis of the specimen 2), after which the connectors 10 and 10a are assembled with one another by screwing the nut 28 of the connector 10a onto the threaded sleeve 8 of the connector 10, whose threaded portion has been lengthened for this purpose.

The specimen holder with the specimen 2 is then fixed between the connectors 10, 10a, as can be seen in FIG. 2. Thus, the measuring line 14 is obtained which, in the present case, is a coaxial air line. Specimen 2 replaces the air over a length of the measuring line 14 equal to the thickness e of the specimen 2.

It is pointed out that in order to obtain a good electrical continuity of the measuring line, the two parts of the specimen holder (namely the central core 4 and the ring 6) have strictly the same thickness E. This thickness E is equal to or slightly larger than the thickness e of the specimen 2. Typically, the thickness E is at the most equal to e+0.1 mm.

In order to perform the measurements, use is made of a measuring apparatus 32 such as a network analyzer of the type marketed by Hewlett-Packard under reference HP 8510 and said measuring apparatus 32 is connected to the measuring line 14 by means of a coaxial cable 30, whose core and braiding are respectively connected -to the internal conductor 16 and to the external conductor 18 of the coaxial connector 10 and another coaxial cable 30a, whose core and braiding are respectively connected to the internal conductor 16 and the external conductor 18 of the coaxial connector 10a, as can be seen in FIG. 2.

Using a specimen of the material marketed by XTAL-ONIX under the reference K30, a dielectric permittivity value of 29 is obtained, which is constant over the entire measuring band between 50 MHz and 18 GHz. Thus, the measuring error passes from 43% to 3.3% if reference is made to the value given by XTALONIX.

Thus, the invention makes it possible to considerably increase the coaxial line measuring precision. This leads to a considerable time gain in the wide band characterization of the materials.

The numerical results given hereinafter correspond to a dielectric material, but the invention also makes it possible to improve the results concerning magnetic materials.

Thus, the clearance-free fitting used in the present invention leads to no magnetostriction effect on such magnetic materials (unlike what would e.g. happen in the case of a clamp).

Experiments which have been performed demonstrate that the process according to the invention is usable up to approximately 70° C. Moreover, in the example described with reference to FIGS. 1 and 2, use is made of a coaxial line for performing the measurements.

However, the process according to the invention can also be performed using a rectangular waveguide. This is diagrammatically illustrated by FIGS. 3 and 4, which show a measuring line 34 constituted by two rectangular waveguides 36 and 38 between which is fitted a specimen holder 40 also constituted by a rectangular waveguide (which is screwed to the adjacent waveguides 36 and 38).

To carry out the measurements, use is once again made of a network analyzer 32, which is connected to the waveguide 36 by means of a coaxial cable 44, a connector 46 and an adaptor 48 and which is connected to the waveguide 38 by means of a coaxial cable 50, a connector 52 and an adaptor 54, as can be seen in FIG. 3 (reference should also be made in this connection to document (2)).

FIG. 4 shows a parallelepipedic specimen 56 to be measured and which is inserted and brazed in the specimen holder 40, the brazing method being comparable with that described hereinbefore.

FIG. 4 shows that the transverse dimensions (width L and height H) of the cavity of the specimen holder 40 are slightly larger than the corresponding dimensions of the specimen 56, the gap between the specimen holder 40 and the specimen 56 being filled by the brazed joint used 58. The length of the cavity of the specimen holder 40 is equal to or slightly larger than the length of the specimen 56.

We claim:

1. Process for measuring dielectric and magnetic parameters of a solid material, according to which a specimen (2, 56) of said material is placed in an electrically conductive specimen holder (4, 6, 40), said specimen holder is fitted in a measuring line (14, 34), and said measuring line is connected to a measuring apparatus (32) able to supply information on the basis of which the parameters are calculated, characterized in that the specimen (2, 56) is brazed in the specimen holder (4, 6, 40) by means of an ambient temperature brazed point (12, 58) essentially consisting of a ternary mixture having a weight composition of approximately 19% indium, 60% gallium, and 21% tin, wherein viscosity of the ternary mixture is regulated by adding tin.

2. Process according to claim 1, characterized in that, prior to brazing, the specimen holder (4, 6, 40) is cleaned with ethanol and the faces of the specimen holder and the specimen which are is intended to receive the brazed joint (12, 58) are rubbed with a pure indium sheet.

3. Process according to claim 1, characterized in that the specimen (2) is annular, in that the specimen holder has a cylindrical central core (4) and a ring (6) between which the specimen is inserted and brazed, in that the measuring line (14) has a first coaxial connector (10) having a threaded sleeve (8), whose length is adequate to receive the specimen holder (4, 6) and a second coaxial connector (10a), in that the specimen holder provided with the specimen is inserted in the threaded sleeve (8) of the first connector (10) in such a way that the axis of said first connector coincides with the axis of the specimen and in that the second connector (10a) is connected to the first connector (10) by means of said threaded sleeve (8).

4. Process according to claim 3, characterized in that the central core (4) and the ring (6) of the specimen holder have the same thickness (E), which is equal to or slightly larger than that (e) of the specimen (2).

5. Process according to claim 3, characterized in that the central core (4) and ring (6) of the specimen holder are made from brass.

6. Process according to claim 1, characterized in that the specimen (56) is shaped like a rectangular parallelepiped, in that the specimen holder (40) is a rectangular waveguide in which the specimen is inserted and brazed and in that the measuring line (34) has two rectangular waveguides (36, 38) between which the specimen holder (40) is fitted.

* * * * *

UNITED STATES PATENT AND TRADEMARK OFFICE
CERTIFICATE OF CORRECTION

PATENT NO. : 5,818,244
DATED : October 6, 1998
INVENTOR(S) : Authesserre et al.

It is certified that error appears in the above-identified patent and that said Letters Patent is hereby corrected as shown below:

Column 2, Line 8, delete "17" and insert --17.--.

Column 5, Line 49, delete "-to" and insert --to--.

Column 5, Line 57, delete "29" and insert --29.--.

Column 6, Line 45, Claim 1, delete "point" and insert --joint--.

Signed and Sealed this

Twenty-fourth Day of October, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO.   : 5,818,244
DATED        : October 6, 1998
INVENTOR(S)  : Authesserre et al.

Page 1 of 1

It is certified that error appears in the above-identified patent and that said Letters Patent is hereby corrected as shown below:

<u>Title page,</u>
Please insert

|  |  |  |  |
|---|---|---|---|
| -- | [22] | PCT Filed: | November 10, 1993 |
|  | [86] | PCT No.: | PCT/FR93/01104 |
|  |  | §371 Date: | July 7, 1994 |
|  | [87] | PCT Pub. No.: | WO 94/11746 |
|  |  | PCT Pub. Date: | May 26, 1994 -- |

Signed and Sealed this

Twenty-fourth Day of December, 2002

JAMES E. ROGAN
*Director of the United States Patent and Trademark Office*